United States Patent
Leinweber et al.

(10) Patent No.: US 8,722,589 B2
(45) Date of Patent: *May 13, 2014

(54) USE OF 1-ALKYL-5-OXOPYRROLIDINE-3-CARBOXYLIC ESTERS AS GAS HYDRATE INHIBITORS WITH IMPROVED BIODEGRADABILITY

(75) Inventors: Dirk Leinweber, Kelkheim (DE); Alexander Roesch, Gimbsheim (DE); Michael Feustel, Köngemheim (DE)

(73) Assignee: Clariant Finance (BVI) Limited, Tortola (VG)

( * ) Notice: Subject to any disclaimer, the term of this patent is extended or adjusted under 35 U.S.C. 154(b) by 966 days.

This patent is subject to a terminal disclaimer.

(21) Appl. No.: 12/221,299

(22) Filed: Aug. 1, 2008

(65) Prior Publication Data

US 2009/0042747 A1    Feb. 12, 2009

(30) Foreign Application Priority Data

Aug. 6, 2007    (DE) .......................... 10 2007 037 016

(51) Int. Cl.
  *C09K 8/528*    (2006.01)
  *C09K 8/60*    (2006.01)
  *C09K 8/54*    (2006.01)

(52) U.S. Cl.
  USPC ........... 507/242; 507/241; 507/239; 507/268; 507/90

(58) Field of Classification Search
  CPC ............ C09K 8/528; C09K 8/506; C09K 8/52
  USPC ........... 507/90, 202, 239, 242, 244, 260, 267, 507/268
  See application file for complete search history.

(56) References Cited

U.S. PATENT DOCUMENTS

| | | | |
|---|---|---|---|
| 2,765,045 A * | 10/1956 | Meyers | ............................ 95/176 |
| 3,224,975 A | 12/1965 | Hinkamp | |
| 4,079,041 A | 3/1978 | Baumann et al. | |
| 4,127,493 A | 11/1978 | Elliott et al. | |
| 4,774,255 A | 9/1988 | Black et al. | |
| 5,244,878 A | 9/1993 | Sugier et al. | |
| 5,880,252 A | 3/1999 | Kim et al. | |
| 6,093,862 A | 7/2000 | Sinquin et al. | |
| 6,566,309 B1 | 5/2003 | Klug et al. | |
| 6,894,007 B2 | 5/2005 | Klug et al. | |
| 7,615,102 B2 | 11/2009 | Leinweber et al. | |
| 2008/0113878 A1 | 5/2008 | Leinweber et al. | |
| 2008/0177103 A1 | 7/2008 | Leinweber et al. | |
| 2008/0214865 A1 | 9/2008 | Leinweber et al. | |
| 2009/0043146 A1 | 2/2009 | Leinweber et al. | |
| 2009/0054268 A1 | 2/2009 | Leinweber et al. | |
| 2009/0124786 A1 | 5/2009 | Feustel et al. | |
| 2010/0213408 A1 | 8/2010 | Feustel et al. | |

FOREIGN PATENT DOCUMENTS

| | | |
|---|---|---|
| DE | 4333238 | 4/1995 |
| DE | 10259815 | 7/2004 |
| DE | 102005054037 | 5/2007 |
| DE | 102007037015 | 10/2008 |
| EP | 0069512 | 1/1983 |
| EP | 0896123 | 2/1999 |
| GB | 1323061 | 7/1973 |
| WO | WO93/25798 | 12/1993 |
| WO | WO 94/12761 * | 6/1994 |
| WO | WO2004/056885 | 7/2004 |
| WO | WO2006/084613 | 8/2006 |
| WO | WO2007/054225 | 5/2007 |
| WO | WO2007/054226 | 5/2007 |

OTHER PUBLICATIONS

English Abstract for WO 2004/056885.
International Search Report for EP 08 01 3825.
German Office Action for DE 10 2007 037 016.6.
International Search Report for EP 08 01 3824.

* cited by examiner

*Primary Examiner* — Bijan Ahvazi
*Assistant Examiner* — Atnaf Admasu
(74) *Attorney, Agent, or Firm* — Tod A. Waldrop

(57) ABSTRACT

The invention provides for the use of 1-alkyl-5-oxopyrrolidine-3-carboxylic esters, preparable by esterifying alcohols having from 1 to 100 hydroxyl groups with 1-alkyl-5-oxopyrrolidine-3-carboxylic acid, in amounts of from 0.01 to 2% by weight for preventing the formation of gas hydrates in aqueous phases which are in contact with a gaseous, liquid or solid organic phase.

8 Claims, No Drawings

USE OF 1-ALKYL-5-OXOPYRROLIDINE-3-CARBOXYLIC ESTERS AS GAS HYDRATE INHIBITORS WITH IMPROVED BIODEGRADABILITY

The present invention is described in the German priority application No. 102007037016.6, filed Jun. 8, 2007, which is hereby incorporated by reference as is fully disclosed herein.

The present invention relates to the use of 1-alkyl-5-oxopyrrolidine-3-carboxylic esters as gas hydrate inhibitors and to a process for inhibiting nucleation, growth and/or agglomeration of gas hydrates by adding an effective amount of an inhibitor which comprises 1-alkyl-5-oxopyrrolidine-3-carboxylic esters to a polyphasic mixture which consists of water, gas and optionally condensate and has a tendency to form gas hydrates, or to a drilling fluid having a tendency to form gas hydrates.

Gas hydrates are crystalline inclusion compounds of gas molecules in water which form under certain temperature and pressure conditions (low temperature and high pressure). The water molecules form cage structures around the appropriate gas molecules. The lattice structure formed from the water molecules is thermodynamically unstable and is only stabilized by the incorporation of guest molecules. Depending on pressure and gas composition, these icelike compounds can exist even beyond the freezing point of water (up to above 25° C.).

In the mineral oil and natural gas industry, great significance attaches in particular to the gas hydrates which form from water and the natural gas constituents methane, ethane, propane, isobutane, n butane, nitrogen, carbon dioxide and hydrogen sulfide. Especially in modern natural gas extraction, the existence of these gas hydrates constitutes a great problem, especially when wet gas or polyphasic mixtures of water, gas and alkane mixtures are subjected to low temperatures under high pressure. As a consequence of their insolubility and crystalline structure, the formation of gas hydrates leads here to the blockage of a wide variety of extraction equipment such as pipelines, valves or production equipment in which wet gas or polyphasic mixtures are transported over relatively long distances at relatively low temperatures, as occurs especially in colder regions of the earth or on the seabed. Moreover, gas hydrate formation can also lead to problems in the course of the drilling operation to develop new gas or crude oil deposits at the appropriate pressure and temperature conditions by the formation of gas hydrates in the drilling fluids.

In order to prevent such problems, gas hydrate formation in gas pipelines, in the course of transport of polyphasic mixtures or in drilling fluids, can be suppressed by using relatively large amounts (more than 10% by weight, based on the weight of the aqueous phase) of lower alcohols such as methanol, glycol or diethylene glycol. The addition of these additives has the effect that the thermodynamic limit of gas hydrate formation is shifted to lower temperatures and higher pressures (thermodynamic inhibition). However, the addition of these thermodynamic inhibitors causes serious safety problems (flashpoint and toxicity of the alcohols), logistical problems (large storage tanks, recycling of these solvents) and accordingly high costs, especially in offshore extraction.

Attempts are therefore now being made to replace thermodynamic inhibitors by adding additives in amounts of <2% in temperature and pressure ranges in which gas hydrates can form. These additives either delay gas hydrate formation (kinetic inhibitors) or keep the gas hydrate agglomerates small and therefore pumpable, so that they can be transported through the pipeline (agglomerate inhibitors or antiagglomerants). The inhibitors used either prevent nucleation and/or the growth of the gas hydrate particles, or modify the hydrate growth in such a way that relatively small hydrate particles result.

The gas hydrate inhibitors which have been described in the patent literature, in addition to the known thermodynamic inhibitors, are a multitude of monomeric and also polymeric substance classes which are kinetic inhibitors or antiagglomerants. Of particular significance in this context are polymers having a carbon backbone which contain both cyclic (pyrrolidone or caprolactam radicals) and acyclic amide structures in the side groups.

For instance, WO-94/12761 discloses a process for kinetically inhibiting gas hydrate formation by the use of polyvinyllactams having a molecular weight of MW>40000 D, and WO-93/25798 discloses such a process using polymers and/or copolymers of vinylpyrrolidone having a molecular weight of MW>5000 to 40000 D.

EP-A-0 896 123 discloses gas hydrate inhibitors which may comprise copolymers of alkoxylated methacrylic acid without alkyl end capping and cyclic N vinyl compounds.

U.S. Pat. No. 5,244,878 describes a process for retarding the formation or reducing the tendency to form gas hydrates. To this end, polyols which are esterified with fatty acids or alkenylsuccinic anhydrides are used. The compounds prepared do not have any amino acid functions which can interact with clathrates (cage molecules).

The additives described have only limited efficacy as kinetic gas hydrate inhibitors and/or antiagglomerants, have to be used with coadditives, or are unobtainable in a sufficient amount or obtainable only at high cost.

In order to be able to use gas hydrate inhibitors even in the case of greater cooling than currently possible, i.e. further within the hydrate region, a further enhancement of action is required in comparison to the prior art hydrate inhibitors. In addition, improved products are desired with regard to their biodegradability.

It was thus an object of the present invention to find improved additives which both slow the formation of gas hydrates (kinetic inhibitors) and keep gas hydrate agglomerates small and pumpable (antiagglomerants), in order thus to ensure a broad spectrum of application with high potential action. Furthermore, they should be capable of replacing the currently used thermodynamic inhibitors (methanol and glycols), which cause considerable safety problems and logistical problems.

Since currently used inhibitors such as polyvinylpyrrolidone and polyvinylcaprolactam have only a moderate biodegradability, the inventive compounds should additionally have an improved biodegradability.

The prior art discloses 1-alkyl-5-oxopyrrolidine-3-carboxylic acid derivatives which are not used as gas hydrate inhibitors but rather in other fields.

For instance, GB-1 323 061 discloses N-substituted 5-oxopyrrolidine-3-carboxylic acids and their use in functional fluids, especially hydraulic fluids.

U.S. Pat. No. 3,224,975 discloses 1-alkyl-5-oxopyrrolidine-3-carboxylic acids which are used as corrosion protection additives in lubricants.

U.S. Pat. No. 4,127,493 discloses polyesters which are prepared by reacting N-substituted 5-oxopyrrolidine-3-carboxylic acids or esters with alkenylsuccinic acid or alkenylsuccinic anhydride, and their use as oil-soluble additives in lubricants.

EP-A-0 069 512 discloses N-substituted 5-oxopyrrolidine-3-carboxylic acid salts and the use thereof as humectants.

As has now been found, surprisingly, both water-soluble and oil-soluble 1-alkyl-5-oxopyrrolidine-3-carboxylic esters are suitable as gas hydrate inhibitors. According to the structure, these esters can delay both the nucleation and the growth of gas hydrates (kinetic gas hydrate inhibitors) and suppress the agglomeration of gas hydrates (antiagglomerants). In addition, the inventive compounds have a significantly improved biodegradability.

The invention therefore provides for the use of 1-alkyl-5-oxopyrrolidine-3-carboxylic esters, preparable by esterifying at least one alcohol having from 1 to 100 hydroxyl groups with 1-alkyl-5-oxopyrrolidine-3-carboxylic acid, in amounts of from 0.01 to 2% by weight for preventing the formation of gas hydrates in aqueous phases which are in contact with a gaseous, liquid or solid organic phase.

The invention further provides a process for inhibiting the formation of gas hydrates by adding 1-alkyl-5-oxopyrrolidine-3-carboxylic esters, preparable by esterifying at least one alcohol having from 1 to 100 hydroxyl groups with 1-alkyl-5-oxopyrrolidine-3-carboxylic acid, in amounts of from 0.01 to 2% by weight to an aqueous phase which is in contact with a gaseous, liquid or solid organic phase and in which gas hydrate formation is to be prevented.

The alcohol preferably corresponds to the formula (1)

$$R\text{-}[\text{OH}]_n \qquad (1)$$

in which R is an organic radical having from 1 to 100 carbon atoms. Apart from hydroxyl groups, R may comprise any further substituents, for example amino or amido substituents. R is more preferably an alkyl or polyalkylene oxide radical having from 1 to 30 carbon atoms. n is preferably from 1 to 100, in particular 2 to 80, especially 3 to 10. The number of hydroxyl groups is generally less than or equal to the number of carbon atoms in the R radical.

Particularly preferred alcohols of the formula (1) are methanol, ethanol, propanol, butanol, pentanol, isopropanol, isobutanol, isopentanol, 2-ethylhexanol, heptanol, octanol, decanol, ethylene glycol, propylene glycol, butylglycol, butyldiglycol, butyltriglycol, glycerol, diglycerol, triglycerol, tetraglycerol, polyglycerol, trimethylolpropane, pentaerythritol, dipentaerythritol, tripentaerythritol, sorbitol, sorbitan, diethylene glycol, triethylene glycol, propylene glycol, dipropylene glycol, tripropylene glycol and tris(hydroxymethyl)aminomethane.

Further preferred alcohols are saturated or unsaturated $C_8$-$C_{24}$ fatty alcohols, potentially dodecanol, tetradecanol, hexadecanol, octadecanol or oleyl alcohol.

1-alkyl-5-oxopyrrolidine-3-carboxylic acid corresponds to the formula (2):

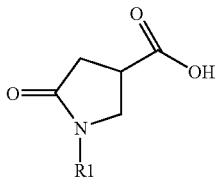

(2)

where R1 is $C_1$-$C_{30}$-alkyl, $C_2$-$C_{30}$-alkenyl or $C_7$-$C_{30}$-alkylaryl.

R1 is preferably an aliphatic $C_1$-$C_{10}$ radical which may be branched or unbranched. More preferably, R1 is an aliphatic $C_3$-$C_6$ radical, specifically an aliphatic $C_4$ radical. According to the invention, it is also possible to use mixtures of 1-alkyl-5-oxopyrrolidine-3-carboxylic acids substituted by different R1 radicals to prepare the 1-alkyl-5-oxopyrrolidine-3-carboxylic esters.

The preparation of the 1-alkyl-5-oxopyrrolidine-3-carboxylic acids is effected as described in detail in the prior art by reacting itaconic acid with primary amines and can be carried out as disclosed in EP-A-0 069 512, U.S. Pat. No. 3,224,975 and U.S. Pat. No. 4,127,493.

In the esters formed from alcohol and acid of the formula 2, preferably at least 30%, more preferably at least 50%, of all OH functions present in the alcohol have been esterified.

The inventive 1-alkyl-5-oxopyrrolidine-3-carboxylic esters are preparable by esterifying 1-alkyl-5-oxopyrrolidine-3-carboxylic acid with at least one alcohol. The inventive esters are prepared by uncatalyzed or acid-catalyzed condensation of the 1-alkyl-5-oxopyrrolidine-3-carboxylic acid with the alcohol. The reaction temperature is generally between 100 and 300° C., preferably from 170 to 250° C.

The molar ratio of OH groups in the alcohol relative to the 1-alkyl-5-oxopyrrolidine-3-carboxylic acid employed in the esterification is preferably between 1:0.3 and 1:1, especially between 1:0.5 and 1:1.

The reaction can be carried out at atmosphere pressure or reduced pressure. The catalyzing acids include, for example, HCl, $H_2SO_4$, sulfonic acids, $H_3PO_4$ or acidic ion exchangers, which are used in amounts of from 0.1 to 5% by weight, based on the weight of the reaction mixture. The esterification takes generally from 3 to 30 hours.

The inventive 1-alkyl-5-oxopyrrolidine-3-carboxylic esters can be used alone or in combination with other known gas hydrate inhibitors. In general, an amount of the inventive 1-alkyl-5-oxopyrrolidine-3-carboxylic ester sufficient to obtain sufficient inhibition under the given pressure and temperature conditions will be added to the system which tends to form hydrates. The inventive 1-alkyl-5-oxopyrrolidine-3-carboxylic esters are generally used preferably in amounts between 0.02 and 1% by weight (based on the weight of the aqueous phase). When the inventive 1-alkyl-5-oxopyrrolidine-3-carboxylic esters are used in a mixture with gas hydrate inhibitors, the concentration of the mixture is from 0.01 to 2% by weight or from 0.02 to 1% by weight in the aqueous phase.

The 1-alkyl-5-oxopyrrolidine-3-carboxylic esters are preferably dissolved for use as gas hydrate inhibitors in water or water-miscible (preferably alcoholic) solvents, for example methanol, ethanol, propanol, butanol, ethylene glycol, 1,2-propylene glycol, 1,3-propylene glycol, glycerol, diethylene glycol, triethylene glycol, N-methylpyrrolidone and oxyethylated monoalcohols, such as butylglycol, isobutylglycol, butyldiglycol.

Oil-soluble 1-alkyl-5-oxopyrrolidine-3-carboxylic esters are preferably dissolved for use as gas hydrate inhibitors in relatively nonpolar solvents such as $C_3$-$C_8$-ketones, for example diisobutyl ketone, methyl isobutyl ketone, cyclohexanone, or $C_5$-$C_{12}$-alcohols, for example 2-ethylhexanol.

EXAMPLES

Preparation of the
1-alkyl-5-oxopyrrolidine-3-carboxylic Esters

Example 1

Preparation of isobutyl
1-methyl-5-oxopyrrolidine-3-carboxylate

In a 500 ml four-neck flask with stirrer, thermometer, nitrogen purge and reflux condenser, 143 g of 1-methyl-5-oxopyrrolidine-3-carboxylic acid, 148 g of isobutanol and 1.5 g of p-toluenesulfonic acid were mixed and heated under reflux at 140° C. for 8 h. After cooling and replacing the reflux condenser with a distillation system, approx. 100 ml of isobutanol-water mixture were distilled off at 140° C. within 6 h. This affords approx. 193 g of isobutyl 1-methyl-5-oxopyrrolidine-3-carboxylate with a hydrolysis number of 280 mg KOH/g.

Example 2

Preparation of 2-ethylhexyl 1-methyl-5-oxopyrrolidine-3-carboxylate

In a 500 ml four-neck flask with stirrer, thermometer, nitrogen purge and reflux condenser, 143 g of 1-methyl-5-oxopyrrolidine-3-carboxylic acid, 195 g of 2-ethylhexanol and 1.5 g of p-toluenesulfonic acid were mixed and heated under reflux at 200° C. for 4 h. After cooling and replacing the reflux condenser with a distillation system, approx. 88 ml of 2-ethylhexanol-water mixture were distilled off at 200° C. within 6 h. This affords approx. 251 g of 2-ethylhexyl 1-methyl-5-oxopyrrolidine-3-carboxylate with a hydrolysis number of 217 mg KOH/g.

Example 3

Preparation of glyceryl tri(1-methyl-5-oxopyrrolidine-3-carboxylate)

In a 250 ml four-neck flask with stirrer, thermometer, nitrogen purge and distillation system, 143 g of 1-methyl-5-oxopyrrolidine-3-carboxylic acid, 31 g of glycerol and 1.0 g of p-toluenesulfonic acid were mixed and heated to 200° C. Within 12 h at 200° C., approx. 18 ml of water were distilled off. This afforded approx. 155 g of glyceryl tri(1-methyl-5-oxopyrrolidine-3-carboxylate) with a hydrolysis number of 357 mg KOH/g.

Example 4

Preparation of pentaerythritol di(1-methyl-5-oxopyrrolidine-3-carboxylate)

In a 500 ml four-neck flask with stirrer, thermometer, nitrogen purge and distillation system, 143 g of 1-methyl-5-oxopyrrolidine-3-carboxylic acid, 68 g of pentaerythritol and 1.0 g of p-toluenesulfonic acid were mixed and heated to 200° C. Within 8 h at 200° C., approx. 18 ml of water were distilled off. This afforded approx. 195 g of pentaerythritol di(1-methyl-5-oxopyrrolidine-3-carboxylate) with a hydrolysis number of 290 mg KOH/g.

Example 5

Preparation of dipentaerythrityl tetra(1-methyl-5-oxopyrrolidine-3-carboxylate)

In a 500 ml four-neck flask with stirrer, thermometer, nitrogen purge and distillation system, 143 g of 1-methyl-5-oxopyrrolidine-3-carboxylic acid, 64 g of dipentaerythritol and 1.0 g of p-toluenesulfonic acid were mixed and heated to 200° C. Within 10 h at 200° C., approx. 18 ml of water were distilled off. This afforded approx. 189 g of dipentaerythrityl tetra(1-methyl-5-oxopyrrolidine-3-carboxylate) with a hydrolysis number of 299 mg KOH/g.

Example 6

Preparation of butyltriglycol 1-methyl-5-oxopyrrolidine-3-carboxylate

In a 500 ml four-neck flask with stirrer, thermometer, nitrogen purge and distillation system, 143 g of 1-methyl-5-oxopyrrolidine-3-carboxylic acid, 206 g of butyltriglycol and 1.5 g of p-toluenesulfonic acid were mixed and heated to 200° C. Within 8 h at 200° C., approx. 18 ml of water were distilled off. This afforded approx. 334 g of butyltriglycol-1-methyl-5-oxopyrrolidine-3-carboxylate with a hydrolysis number of 172 mg KOH/g.

Example 7

Preparation of (oleyl alcohol+5 EO) 1-methyl-5-oxopyrrolidine-3-carboxylate

In a 1000 ml four-neck flask with stirrer, thermometer, nitrogen purge and distillation system, 143 g of 1-methyl-5-oxopyrrolidine-3-carboxylic acid, 490 g of oleyl alcohol+5 EO and 2.0 g of p-toluenesulfonic acid were mixed and heated to 200° C. Within 8 h at 200° C., approx. 18 ml of water were distilled off. This afforded approx. 617 g of (oleyl alcohol+5 EO) 1-methyl-5-oxopyrrolidine-3-carboxylate with a hydrolysis number of 93 mg KOH/g.

Example 8

Preparation of polyglyceryl(n=20) poly(1-methyl-5-oxopyrrolidine-3-carboxylate)

In a 500 ml four-neck flask with stirrer, thermometer, nitrogen purge and distillation system, 143 g of 1-methyl-5-oxopyrrolidine-3-carboxylic acid, 129 g of polyglycerol (degree of condensation n=20) and 1.5 g of p-toluenesulfonic acid were mixed and heated to 200° C. Within 16 h at 200° C., approx. 18 ml of water were distilled off. This afforded approx. 256 g of polyglyceryl(n=20) poly(1-methyl-5-oxopyrrolidine-3-carboxylate) with a hydrolysis number of 224 mg KOH/g.

Example 9

Preparation of polyglyceryl(n=40) poly(1-methyl-5-oxopyrrolidine-3-carboxylate

In a 500 ml four-neck flask with stirrer, thermometer, nitrogen purge and distillation system, 143 g of 1-methyl-5-oxopyrrolidine-3-carboxylic acid, 86 g of polyglycerol (degree of condensation n=40) and 1.5 g of p-toluenesulfonic acid were mixed and heated to 200° C. Within 16 h at 200° C., approx. 18 ml of water were distilled off. This afforded approx. 213 g of polyglyceryl(n=40) poly(1-methyl-5-oxopyrrolidine-3-carboxylate) with a hydrolysis number of 268 mg KOH/g.

Example 10

Preparation of isobutyl 1-isobutyl-5-oxopyrrolidine-3-carboxylate

In a 500 ml four-neck flask with stirrer, thermometer, nitrogen purge and reflux condenser, 185 g of 1-isobutyl-5-oxopyrrolidine-3-carboxylic acid, 148 g of isobutanol and 1.5 g of p-toluenesulfonic acid were mixed and heated under reflux at 140° C. for 8 h. After cooling and replacing the reflux condenser with a distillation system, approx. 101 ml of isobutanol-water mixture were distilled off at 140° C. within 6 h. This affords approx. 236 g of isobutyl 1-isobutyl-5-oxopyrrolidine-3-carboxylate with a hydrolysis number of 237 mg KOH/g.

Example 11

Preparation of 2-ethylhexyl 1-isobutyl-5-oxopyrrolidine-3-carboxylate

In a 500 ml four-neck flask with stirrer, thermometer, nitrogen purge and reflux condenser, 185 g of 1-isobutyl-5-oxopyrrolidine-3-carboxylic acid, 195 g of 2-ethylhexanol and 2 g of p-toluenesulfonic acid were mixed and heated under reflux at 200° C. for 4 h. After cooling and replacing the reflux condenser with a distillation system, approx. 89 ml of 2-ethylhexanol-water mixture were distilled off at 200° C. within 6 h. This affords approx. 294 g of 2-ethylhexyl 1-isobutyl-5-oxopyrrolidine-3-carboxylate with a hydrolysis number of 193 mg KOH/g.

Example 12

Preparation of glyceryl tri(1-isobutyl-5-oxopyrrolidine-3-carboxylate)

In a 500 ml four-neck flask with stirrer, thermometer, nitrogen purge and distillation system, 185 g of 1-isobutyl-5-oxopyrrolidine-3-carboxylic acid, 31 g of glycerol and 1.0 g of p-toluenesulfonic acid were mixed and heated to 200° C. Within 12 h at 200° C., approx. 18 ml of water were distilled off. This afforded approx. 199 g of glyceryl tri(1-isobutyl-5-oxopyrrolidine-3-carboxylate) with a hydrolysis number of 285 mg KOH/g.

Example 13

Preparation of pentaerythrityl di(1-isobutyl-5-oxopyrrolidine-3-carboxylate)

In a 500 ml four-neck flask with stirrer, thermometer, nitrogen purge and distillation system, 185 g of 1-isobutyl-5-oxopyrrolidine-3-carboxylic acid, 68 g of pentaerythritol and 1.5 g of p-toluenesulfonic acid were mixed and heated to 200° C. Within 8 h at 200° C., approx. 18 ml of water were distilled off. This afforded approx. 235 g of pentaerythrityl di(1-isobutyl-5-oxopyrrolidine-3-carboxylate) with a hydrolysis number of 241 mg KOH/g.

Example 14

Preparation of dipentaerythrityl tetra(1-isobutyl-5-oxopyrrolidine-3-carboxylate)

In a 500 ml four-neck flask with stirrer, thermometer, nitrogen purge and distillation system, 185 g of 1-isobutyl-5-oxopyrrolidine-3-carboxylic acid, 64 g of dipentaerythritol and 1.5 g of p-toluenesulfonic acid were mixed and heated to 200° C. Within 10 h at 200° C., approx. 18 ml of water were distilled off. This afforded approx. 233 g of dipentaerythrityl tetra(1-isobutyl-5-oxopyrrolidine-3-carboxylate) with a hydrolysis number of 245 mg KOH/g.

Example 15

Preparation of butyltriglycol 1-isobutyl-5-oxopyrrolidine-3-carboxylate

In a 500 ml four-neck flask with stirrer, thermometer, nitrogen purge and distillation system, 185 g of 1-isobutyl-5-oxopyrrolidine-3-carboxylic acid, 206 g of butyltriglycol and 2.0 g of p-toluenesulfonic acid were mixed and heated to 200° C. Within 8 h at 200° C., approx. 18 ml of water were distilled off. This afforded approx. 374 g of butyltriglycol 1-isobutyl-5-oxopyrrolidine-3-carboxylate with a hydrolysis number of 153 mg KOH/g.

Example 16

Preparation of (oleyl alcohol+5 EO) 1-isobutyl-5-oxopyrrolidine-3-carboxylate

In a 1000 ml four-neck flask with stirrer, thermometer, nitrogen purge and distillation system, 185 g of 1-isobutyl-5-oxopyrrolidine-3-carboxylic acid, 490 g of oleyl alcohol+5 EO and 3.0 g of p-toluenesulfonic acid were mixed and heated to 200° C. Within 8 h at 200° C., approx. 18 ml of water were distilled off. This afforded approx. 660 g of (oleyl alcohol+5 EO) 1-isobutyl-5-oxopyrrolidine-3-carboxylate with a hydrolysis number of 88 mg KOH/g.

Example 17

Preparation of polyglyceryl(n=20) poly(1-isobutyl-5-oxopyrrolidine-3-carboxylate)

In a 500 ml four-neck flask with stirrer, thermometer, nitrogen purge and distillation system, 185 g of 1-isobutyl-5-oxopyrrolidine-3-carboxylic acid, 129 g of polyglycerol (degree of condensation n=20) and 1.5 g of p-toluenesulfonic acid were mixed and heated to 200° C. Within 16 h at 200° C., approx. 18 ml of water were distilled off. This afforded approx. 298 g of polyglyceryl(n=20) poly(1-isobutyl-5-oxopyrrolidine-3-carboxylate) with a hydrolysis number of 192 mg KOH/g.

Example 18

Preparation of polyglyceryl(n=40) poly(1-isobutyl-5-oxopyrrolidine-3-carboxylate)

In a 500 ml four-neck flask with stirrer, thermometer, nitrogen purge and distillation system, 185 g of 1-isobutyl-5-oxopyrrolidine-3-carboxylic acid, 86 g of polyglycerol (degree of condensation n=40) and 1.5 g of p-toluenesulfonic acid were mixed and heated to 200° C. Within 20 h at 200° C., approx. 18 ml of water were distilled off. This afforded approx. 272 g of polyglyceryl(n=40) poly(1-isobutyl-5-oxopyrrolidine-3-carboxylate) with a hydrolysis number of 224 mg KOH/g.

Example 19

Preparation of isobutyl 1-oleyl-5-oxopyrrolidine-3-carboxylate

In a 1000 ml four-neck flask with stirrer, thermometer, nitrogen purge and reflux condenser, 380 g of 1-oleyl-5- oxopyrrolidine-3-carboxylic acid, 148 g of isobutanol and 2.0 g of p-toluenesulfonic acid were mixed and heated under reflux at 140° C. for 8 h. After cooling and replacing the reflux condenser with a distillation system, approx. 97 ml of isobutanol-water mixture were distilled off at 140° C. within 6 h. This affords approx. 433 g of isobutyl 1-oleyl-5-oxopyrrolidine-3-carboxylate with a hydrolysis number of 132 mg KOH/g.

Example 20

Preparation of 2-ethylhexyl 1-oleyl-5-oxopyrrolidine-3-carboxylate

In a 1000 ml four-neck flask with stirrer, thermometer, nitrogen purge and reflux condenser, 380 g of 1-oleyl-5-oxopyrrolidine-3-carboxylic acid, 195 g of 2-ethylhexanol and 2.5 g of p-toluenesulfonic acid were mixed and heated under reflux at 200° C. for 4 h. After cooling and replacing the reflux condenser with a distillation system, approx. 89 ml of 2-ethylhexanol-water mixture were distilled off at 200° C. within 6 h. This affords approx. 484 g of 2-ethylhexyl 1-oleyl-5-oxopyrrolidine-3-carboxylate with a hydrolysis number of 117 mg KOH/g.

Example 21

Preparation of glyceryl tri(1-oleyl-5-oxopyrrolidine-3-carboxylate)

In a 1000 ml four-neck flask with stirrer, thermometer, nitrogen purge and distillation system, 380 g of 1-oleyl-5-oxopyrrolidine-3-carboxylic acid, 31 g of glycerol and 2.0 g of p-toluenesulfonic acid were mixed and heated to 200° C. Within 12 h at 200° C., approx. 18 ml of water were distilled off. This afforded approx. 394 g of glyceryl tri(1-oleyl-5-oxopyrrolidine-3-carboxylate) with a hydrolysis number of 144 mg KOH/g.

Example 22

Preparation of pentaerythrityl di(1-oleyl-5-oxopyrrolidine-3-carboxylate)

In a 1000 ml four-neck flask with stirrer, thermometer, nitrogen purge and distillation system, 380 g of 1-oleyl-5-oxopyrrolidine-3-carboxylic acid, 68 g of pentaerythritol and 2.0 g of p-toluenesulfonic acid were mixed and heated to 200° C. Within 8 h at 200° C., approx. 18 ml of water were distilled off. This afforded approx. 432 g of pentaerythrityl di(1-oleyl-5-oxopyrrolidine-3-carboxylate) with a hydrolysis number of 132 mg KOH/g.

Example 23

Preparation of dipentaerythrityl tetra(1-oleyl-5-oxopyrrolidine-3-carboxylate)

In a 1000 ml four-neck flask with stirrer, thermometer, nitrogen purge and distillation system, 380 g of 1-oleyl-5-oxopyrrolidine-3-carboxylic acid, 64 g of dipentaerythritol glycerol and 2.0 g of p-toluenesulfonic acid were mixed and heated to 200° C. Within 10 h at 200° C., approx. 18 ml of water were distilled off. This afforded approx. 428 g of dipentaerythrityl tetra(1-oleyl-5-oxopyrrolidine-3-carboxylate) with a hydrolysis number of 134 mg KOH/g.

Example 24

Preparation of polyglyceryl(n=20) poly(1-oleyl-5-oxopyrrolidine-3-carboxylate)

In a 1000 ml four-neck flask with stirrer, thermometer, nitrogen purge and distillation system, 380 g of 1-oleyl-5-oxopyrrolidine-3-carboxylic acid, 129 g of polyglycerol (degree of condensation n=20) and 2.5 g of p-toluenesulfonic acid were mixed and heated to 200° C. Within 16 h at 200° C., approx. 18 ml of water were distilled off. This afforded approx. 493 g of polyglyceryl(n=20) poly(1-oleyl-5-oxopyrrolidine-3-carboxylate) with a hydrolysis number of 117 mg KOH/g.

Example 25

Preparation of polyglyceryl(n=40) poly(1-oleyl-5-oxopyrrolidine-3-carboxylate)

In a 1000 ml four-neck flask with stirrer, thermometer, nitrogen purge and distillation system, 380 g of 1-oleyl-5-oxopyrrolidine-3-carboxylic acid, 86 g of polyglycerol (degree of condensation n=40) and 2.0 g of p-toluenesulfonic acid were mixed and heated to 200° C. Within 20 h at 200° C., approx. 18 ml of water were distilled off. This afforded approx. 450 g of polyglycerol (n=40) poly(1-oleyl-5-oxopyrrolidine-3-carboxylate) with a hydrolysis number of 128 mg KOH/g.

Efficacy of the Products as Gas Hydrate Inhibitors

To investigate the inhibiting action of the 1-alkyl-5-oxopyrrolidine-3-carboxylic esters, a stirred steel autoclave with temperature control, pressure and torque sensor of capacity 450 ml was used. For studies of kinetic inhibition, the autoclave was filled with distilled water and gas in a volume ratio of 20:80; for studies of agglomerate inhibition, condensate was additionally added. Subsequently, 50 bar of natural gas were injected.

Proceeding from a starting temperature of 20° C., the autoclave was cooled to 4° C. within 3 h, then stirred at 4° C. for 18 h and heated back to 20° C. within 2 h. At first, a pressure decrease corresponding to the thermal compression of the gas is observed. When the formation of gas hydrate nuclei occurs during the cooling time, the pressure measured falls, and a rise in the torque measured and a slight increase in the temperature are observed. Without inhibitor, further growth and increasing agglomeration of the hydrate nuclei lead rapidly to a further rise in the torque. When the mixture is heated, the gas hydrates decompose, so that the starting state of the experimental series is attained.

The measure used for the inhibiting action of the product is the time from the attainment of the minimum temperature of 4° C. until the first gas absorption (Tind) or the time until the torque rises (Tagg). Long induction times or agglomeration times indicate an effect as a kinetic inhibitor. The torque measured in the autoclave serves, in contrast, as a parameter for the agglomeration of the hydrate crystals. In the case of a good antiagglomerant, the torque which builds up after gas hydrates have formed is significantly reduced compared to the blank value. In the ideal case, snowlike, fine hydrate crystals form in the condensate phase, do not agglomerate and thus do not lead to blockage of the installations serving for gas transport and for gas extraction.

Test Results

Composition of the natural gas used:
methane 84.8%, ethane 9.2%, propane 2.6%, butane 0.9%, carbon dioxide 1.6%, nitrogen 0.9%.

The comparative substance used was a commercially available gas hydrate inhibitor based on polyvinylpyrrolidone. The dosage in all tests was 5000 ppm based on the water phase.

| 1-alkyl-5-oxopyrrolidine-3-carboxylic ester from example | $T_{ind}$ (h) | $T_{agg}$ (h) |
|---|---|---|
| Blank value | 0 | 0 |
| 1 | 10.9 | 11.0 |
| 2 | 11.5 | 11.7 |
| 3 | 12.0 | 12.5 |
| 4 | 11.4 | 11.5 |
| 5 | 10.0 | 10.1 |
| 6 | 13.1 | 13.4 |
| 8 | 12.7 | 12.8 |
| 9 | 13.0 | 13.9 |
| 10 | 16.1 | 17.0 |
| 11 | 17.5 | 18.3 |
| 12 | 18.1 | 18.8 |
| 13 | 16.9 | 17.4 |
| 14 | 15.3 | 15.9 |
| 15 | 16.1 | 17.2 |
| 17 | 17.5 | 18.9 |
| 18 | 17.6 | 19.5 |
| Comparative | 3.5 | 3.6 |

As can be seen from the above test results, the inventive 1-alkyl-5-oxopyrrolidine-3-carboxylic esters act as kinetic gas hydrate inhibitors and show a clear improvement over the prior art.

In order to test the action as agglomerate inhibitors, the test autoclave used above was initially charged with water and white spirit (20% of the volume in a ratio of 1:2) and, based on the water phase, 5000 ppm of the particular additive were added.

At an autoclave pressure of 50 bar and a stirrer speed of 500 rpm, the temperature was cooled from initially 20° C. within 3 hours to 4° C., then the autoclave was stirred at 4° C. for 18 hours and heated up again. In the course of this, the agglomeration time up to occurrence of gas hydrate agglomerates and the torque which occurred on the stirrer at that time were measured, the latter being a measure of the agglomeration of the gas hydrates.

The comparative substance employed was a commercially available antiagglomerant (quaternary ammonium salt).

| 1-alkyl-5-oxopyrrolidine-3-carboxylic ester from example | $T_{agg}$ (h) | $M_{max}$ (Ncm) |
|---|---|---|
| Blank value | 0.1 | 15.9 |
| 7 | 6.5 | 0.9 |
| 16 | 5.9 | 1.0 |
| 19 | 6.0 | 1.2 |
| 20 | 3.5 | 2.1 |
| 21 | 2.9 | 2.0 |
| 22 | 3.8 | 1.9 |
| 23 | 3.8 | 2.0 |
| 24 | 4.1 | 2.3 |
| 25 | 3.0 | 2.0 |
| Comparative | 2.6 | 4.1 |

As can be seen from these examples, the torques measured are greatly reduced compared to the blank value in spite of gas hydrate formation. This suggests a clear agglomerate-inhibiting action of the inventive products. In addition, the products also have clear action as kinetic inhibitors under the test conditions. All examples show significantly better performance than the commercially available antiagglomerate (comparative=state of the art).

The significantly improved biodegradability (to OECD 306) of selected inventive compounds compared to the state of the art (commercially available polyvinylpyrrolidone) is shown below.

| 1-alkyl-5-oxopyrrolidine-3-carboxylic ester from example | Biodegradability 28 days (OECD 306) |
|---|---|
| Polyvinylpyrrolidone | 5 |
| 1 | 81 |
| 2 | 66 |
| 3 | 90 |
| 10 | 73 |
| 11 | 60 |
| 12 | 85 |
| 16 | 65 |
| 19 | 69 |

The invention claimed is:

1. A process for preventing the formation of gas hydrates in an aqueous phase, wherein the aqueous phase is in contact with a gaseous, liquid or solid organic phase comprising the step of contacting the aqueous phase with at least one 1-alkyl-5-oxopyrrolidine-3-carboxylic ester in an amount of from 0.01 to 2% by weight, wherein the at least one 1-alkyl-5-oxopyrrolidine-3-carboxylic ester is prepared by uncatalyzed or acid-catalyzed condensation of 1-alkyl-5-oxopyrrolidine-3-carboxylic acid with at least one alcohol having from 1 to 100 hydroxyl groups in a reaction temperature between 100 and 250° C.

2. The use process as claimed in claim 1, wherein the alcohol corresponds to the formula (1)

R─[─OH]$_n$     (1)

wherein R is an organic radical having from 1 to 100 carbon atoms and n is from 1 to 100.

3. The process as claimed in claim 2, wherein R is an alkyl, alkenyl or polyalkylene oxide radical having from 1 to 30 carbon atoms.

4. The process as claimed in claim 2, wherein n is from 1 to 10.

5. The process as claimed in claim 1, wherein the alcohol is selected from the group consisting of methanol, ethanol, propanol, butanol, pentanol, isopropanol, isobutanol, isopentanol, 2-ethylhexanol, heptanol, octanol, decanol, ethylene glycol, propylene glycol, butylglycol, butyldiglycol, butyltriglycol, glycerol, diglycerol, triglycerol, tetraglycerol, polyglycerol, trimethylolpropane, pentaerythritol, dipentaerythritol, tripentaerythritol, sorbitol, sorbitan, diethylene glycol, triethylene glycol, propylene glycol, dipropylene glycol, tripropylene glycol, tris(hydroxymethyl)aminomethane, dodecanol, tetradecanol, hexadecanol, octadecanol and oleyl alcohol.

6. The process as claimed in claim 1, wherein at least 30% of all OH groups present in the alcohol are esterified in the at least one 1-alkyl-5-oxopyrrolidine-3-carboxylic ester.

7. The process as claimed in claim 3, wherein n is from 1 to 10.

8. A compound for preventing the formation of gas hydrates in an aqueous phase, wherein the aqueous phase is in contact with a gaseous, liquid or solid organic phase comprising at least one 1-alkyl-5-oxopyrrolidine-3-carboxylic ester, wherein the at least one 1-alkyl-5-oxopyrrolidine-3-carboxylic ester is prepared by uncatalyzed or acid-catalyzed condensation of 1-alkyl-5-oxopyrrolidine-3-carboxylic acid with at least one alcohol haying from 1 to 100 hydroxyl groups in a reaction temperature between 170 and 250° C.

* * * * *